(12) United States Patent
Li et al.

(10) Patent No.: US 10,013,090 B2
(45) Date of Patent: Jul. 3, 2018

(54) SELF-CAPACITANCE TOUCH DISPLAY PANEL AND METHOD OF DRIVING THE SAME, AND TOUCH DISPLAY DEVICE

(71) Applicants: BOE Technology Group Co., Ltd., Beijing (CN); Beijing BOE Optoelectronics Technology Co., Ltd., Beijing (CN)

(72) Inventors: Yanchen Li, Beijing (CN); Shuai Han, Beijing (CN); Panhua Wang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 15 days.

(21) Appl. No.: 15/227,131

(22) Filed: Aug. 3, 2016

(65) Prior Publication Data

US 2017/0115784 A1    Apr. 27, 2017

(30) Foreign Application Priority Data

Oct. 23, 2015 (CN) .......................... 2015 1 0696241

(51) Int. Cl.
 *G06F 3/041* (2006.01)
 *G02F 1/1333* (2006.01)
 (Continued)

(52) U.S. Cl.
 CPC ........ *G06F 3/0412* (2013.01); *G02F 1/13338* (2013.01); *G02F 1/13439* (2013.01); *G06F 3/044* (2013.01); *G02F 2001/134372* (2013.01)

(58) Field of Classification Search
 CPC ........... G02F 1/13338; G02F 1/133514; G02F 1/133528; G02F 1/13439; G02F 1/1362;
 (Continued)

(56) References Cited

U.S. PATENT DOCUMENTS 9,665,222 B2    5/2017  Zhao et al.
2015/0153877 A1  6/2015  Han et al.
 (Continued)

FOREIGN PATENT DOCUMENTS

CN    104142772 A   11/2014
CN    204203592 U    3/2015
CN    104536637 A    4/2015

OTHER PUBLICATIONS

First Office Action from Chinese Patent Application No. 201510696241.9, dated Aug. 1, 2017, 12 pages.
 (Continued)

*Primary Examiner* — Hong Zhou
(74) *Attorney, Agent, or Firm* — Westman, Champlin & Koehler, P.A.

(57) ABSTRACT

Embodiments of the invention disclose a self-capacitance touch display panel, a display device comprising the self-capacitance touch display panel, and a method of driving the self-capacitance touch display panel, so as to increase aperture opening ratio and transmissivity of pixels of the self-capacitance touch display panel. The self-capacitance touch display panel comprises an array substrate and a color filter substrate that are disposed to face one another, the array substrate comprising a common electrode disposed on a base substrate, the common electrode being configured to double as a plurality of touch electrodes, each touch electrode being electrically connected with a touch electrode wire. The touch electrode wire is configured to double as a common electrode wire.

18 Claims, 4 Drawing Sheets

(51) Int. Cl.
*G02F 1/1343* (2006.01)
*G06F 3/044* (2006.01)

(58) Field of Classification Search
CPC .................. G06F 3/0412; G06F 3/044; G06F 2203/04103
See application file for complete search history.

(56) References Cited

U.S. PATENT DOCUMENTS

| | | | |
|---|---|---|---|
| 2016/0026291 A1* | 1/2016 | Zhao ....................... | G06F 3/044 345/174 |
| 2016/0170538 A1* | 6/2016 | Wang .................... | G06F 3/0412 345/173 |
| 2016/0378254 A1 | 12/2016 | Wang et al. | |
| 2017/0060289 A1* | 3/2017 | Shin ........................ | G06F 3/044 |

OTHER PUBLICATIONS

Second Office Action for Chinese Patent Application No. 201510696241.9, dated Dec. 28, 2017, 17 pages.

* cited by examiner

Fig. 5

SELF-CAPACITANCE TOUCH DISPLAY PANEL AND METHOD OF DRIVING THE SAME, AND TOUCH DISPLAY DEVICE

CROSS-REFERENCE TO RELATED APPLICATION

This application claims the benefits of Chinese Patent Application No. 201510696241.9 filed on Oct. 23, 2015 in the State Intellectual Property Office of China, a whole disclosure of which is incorporated herein by reference.

TECHNICAL FIELD

The present invention relates to technical field of touch control and display technologies, and specially, to a self-capacitance touch display panel and a method of driving the same, and a touch display device including the touch display panel.

BACKGROUND

Recently, in order to realize a thin and light touch panel, researches on integration of a touch panel and a liquid crystal display (LCD) panel have been increasingly popular. People are widely interested in an In-Cell type touch solution in which the touch display panel is embedded into the LCD panel. The In-Cell type touch solution may be implemented in a self-capacitance manner and a mutual capacitance manner.

In the self-capacitance manner, a transparent electrically conductive layer used as a common electrode (Vcom) on an array substrate is divided into several blocks used as touch sensor units, a specified metal wire is connected at one end thereof to the touch sensor unit through a via-hole and at the other end thereof to a drive integrated circuit (IC). When a finger touches the touch display panel, a fluctuation in a capacitance of the touch sensor unit is caused at a corresponding position, and a position of the touch can be determined by the drive integrated circuit through detecting the fluctuation in the capacitance, such that a touch control function can be achieved.

In the mutual capacitance manner, transverse touch electrode (Tx) wires are arranged on the array substrate, and longitudinal sensing electrode (Rx) wires are arranged on a color filter substrate. The Tx wires send energizing signals sequentially and all Rx wires receive signals simultaneously, so that a value of capacitance of a two-dimensional plane of the entire touch display panel can be obtained. A position of touch can thereby be calculated based on an amount of change of the value of capacitance, and a touch control function can thereby be realized.

As a conclusion, in a prior art touch display panel based on the self-capacitance manner, since touch control wires connected with the touch sensor units are made of specified metals, a width of the black matrix should be increased to shield the touch control wires, resulting in relative large decreases in aperture opening ratio of pixels and transmissivity.

SUMMARY

The present invention has been made to overcome or alleviate at least one aspect of the above mentioned disadvantages.

Accordingly, it is an object of the present invention to provide a self-capacitance touch display panel and a method of driving the same, and a touch display device comprising the self-capacitance touch display panel, so as to increase pixel aperture opening ratio and transmissivity of the self-capacitance touch display panel.

According to an aspect of the present invention, there is provided a self-capacitance touch display panel.

In an exemplary embodiment, the self-capacitance touch display panel may comprise an array substrate and a color filter substrate that are disposed to face one another. The array substrate may comprises a common electrode disposed on a base substrate and configured to double as a plurality of touch electrodes, and each touch electrode may be electrically connected with a touch electrode wire. The touch electrode wire is configured to double as a common electrode wire. With the self-capacitance touch display panel provided in the embodiment, decreases in aperture opening ratio and transmissivity of pixels due to introduction of a touch electrode wire can be reduced.

In another embodiment, the common electrode may be in a strip shape.

In a further embodiment, the array substrate may comprise a plurality of data lines arranged in parallel with each other, the touch electrode wire may be arranged in the same layer as and insulated from the data lines, and each of the touch electrodes may correspond to at least one touch electrode wire.

In a further embodiment, the array substrate may comprise a plurality of pixel units arranged in an array, each of the pixel units may comprise at least three sub-pixel units and corresponds to one touch electrode wire, and the touch electrode wire is disposed between two adjacent pixel units.

In a further embodiment, the at least three sub-pixel units may comprise a red sub-pixel unit, a green sub-pixel unit and a blue sub-pixel unit, and the touch electrode wire may be arranged close to the blue sub-pixel unit.

In a further embodiment, an area of an orthogonal projection of the touch electrode wire on the base substrate may be equal to an area of an orthogonal projection of the data line on the base substrate.

According to another aspect of the present invention, there is provided a touch display device.

In an exemplary embodiment, the touch display device may comprise the self-capacitance touch display panel according to any one of the above embodiments.

According to a further aspect of the present invention, there is provided a method of driving a self-capacitance touch display panel.

In an exemplary embodiment, the self-capacitance touch display panel may be the self-capacitance touch display panel according to any one of the above embodiments, and the method may comprise: during a display period, loading a common electrode signal onto the touch electrode though the touch electrode wire; and during a touch control period, loading a touch control driving signal onto the touch electrode through the touch electrode wire, receiving a sensing signal outputted from the touch electrode, and determining a position of a touch by a touch control signal detecting module based on the sensing signal outputted from the touch electrode, the touch control signal detecting module being connected with the touch electrode wire electrically connected with the touch electrode.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

Embodiments of the invention are made based on the following considerations.

Figure 2:
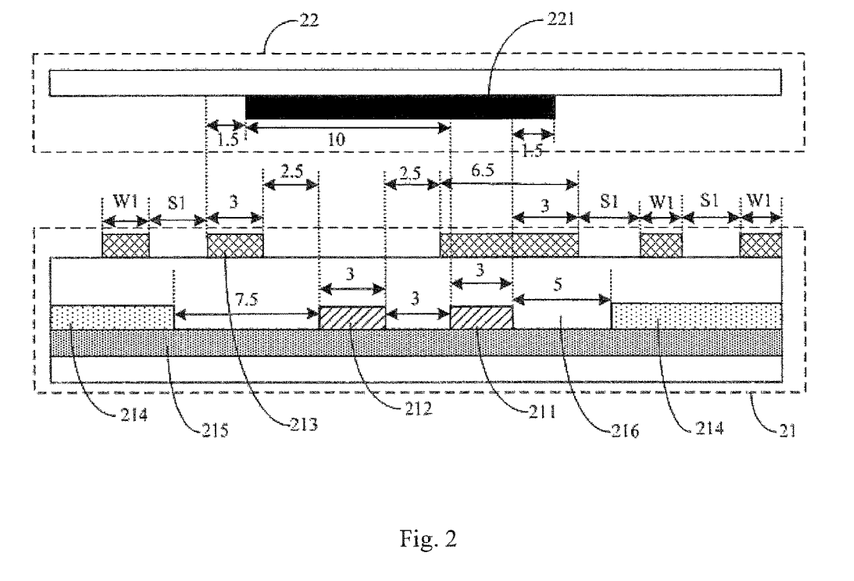
FIG. 2 is an illustrative structure drawing showing a cross section taken along a line A-A1 of FIG. 1.

In order to solve the technical problem of low aperture opening ratio of pixels and transmissivity, a direct technical means is to decrease the width of the black matrix. For the touch display panel in prior arts, however, only decreasing the width of the black matrix may result in an exposure of a region in which deflections of liquid crystals are disordered. As shown in FIG. 2, for example, if only a width of a black matrix 221 at the left side is decreased, a region between a common electrode 213 and a Tx wire 212 will be exposed. Liquid crystals in the exposed region are located at an edge portion of an electric field formed by a pixel electrode 214 and the common electrode 213, thus, their deflections will be disordered, such that display effect of the entire display panel will be affected. Further, as a technical means for solving the technical problem of low aperture opening ratio of pixels and transmissivity, it should also meet an aim that lighting effect would not be decreased.

Terminologies of "left", "right", "up", "down", "horizontal", "vertical" and the like used in this disclosure mean to indicate orientations or directions in association with the drawings, which are only used to facilitate the description of the drawings and should not be regarded as limitations to technical solutions disclosed in embodiments of the invention.

Thicknesses of films, sizes and shapes of regions in the drawings are not to reflect actual or practical sizes or ratios of sizes. Instead, they aim to illustratively explain technical solutions according to an embodiment of the invention.

Figure 1:
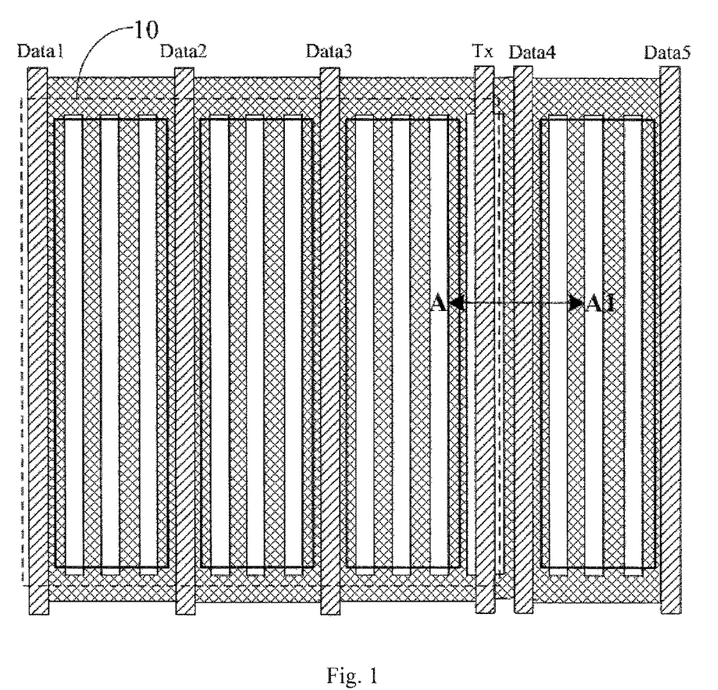
FIG. 1 is a plan view showing a structure of a self-capacitance touch display panel according to prior arts.

FIG. 1 is a plan view showing a structure of a self-capacitance touch display panel in prior arts, and FIG. 2 is an illustrative structure drawing showing a cross section taken along a line A-A1 of FIG. 1. The self-capacitance touch display panel includes an array substrate 21 and a color filter substrate 22 that are disposed to face one another. The array substrate 21 is manufactured through a method having six processes, each of the processes utilizing a mask such that gate electrodes, a semiconductor active layer, pixel electrodes, source electrodes, drain electrodes, a passivation layer and common electrodes are formed on a base substrate successively. A common electrode is divided into several blocks that are also used as touch electrodes. Each of the touch electrodes passes through a via hole formed in the passivation layer and is connected with a touch electrode (Tx) wire, and the Tx wire is finally connected to a drive integrated circuit that is integrated with display and touch control functions.

As shown in FIG. 1, the array substrate includes a plurality of pixel units 10 arranged into an array, and each pixel unit 10 includes a red (R) sub-pixel, a green (G) sub-pixel and a blue (B) sub-pixel. Each pixel unit 10 includes a Tx wire and three data lines, i.e., Data1, Data2 and Data3. The data lines and the Tx wire may be formed in the same metal layer. A Tx wire of one pixel unit and data lines of a next pixel unit form a dual-source configuration. Specifically, the pixel unit 10 shown in FIG. 1 includes a Tx wire and three data lines, Data1, Data2 and Data3. The Tx wire and a data line Data 4 of a next pixel unit including data lines Data4, Data5 and the like form a dual-source configuration.

In order to illustrate a width of a black matrix 221 on the color filter substrate 22 that corresponds to a dual-source configuration of the array substrate 21, typical widths of various components are shown in FIG. 2. As can be seen from FIG. 2, a width of a data line 211 is 3 microns (µm), a width of a Tx wire 212 is 3 µm, and a distance between the data line 211 and the Tx wire 212 is 3 µm. In order to ensure that designs of aperture regions of the black matrix 221 in three sub-pixels are identical, a common electrode 213 should be disposed at a left side of the Tx wire 212, and a distance between the Tx 212 and the common electrode 213 disposed at the left side of the Tx wire 212 is 2.5 µm, such that the Tx wire and the common electrode would not be overlapped with one another even if in a worst condition of fluctuations in manufacturing processes. A width of the common electrode 213 disposed at the left side of the Tx wire 212 is 3 µm, a distance between a right edge of the black matrix 221 and a right edge of the data line 211 is 1.5 µm, a distance between a left edge of the black matrix 221 and a left edge of the Tx wire 212 is 4 µm, a distance between the Tx wire 212 and a pixel electrode 214 shown at the left side of the figure is 7.5 µm, and a distance between the data line 211 and a pixel electrode 214 shown at the right side of the figure is 5 µm, and a width W1 of the common electrode and a distance S1 between two adjacent common electrodes may be set to various different values according to actual production requirements. It can be seen from FIG. 2, the width of the black matrix 221 is 14.5 µm. Reference numeral 215 and reference numeral 216 represent insulating layers respectively.

In a dual-source configuration in prior arts, since the Tx wire and the data lines are formed from the same metal layer, introduction of the Tx wire will result in a reduction of aperture region of a pixel, causing a relative large decrease in pixel transmissivity.

In order to increase pixel aperture opening ratio and transmissivity of a self-capacitance touch display panel, in an aspect of the invention, there is provided a self-capacitance touch display panel, which includes common electrodes located on a base substrate, and the common electrodes are also used as touch electrodes that are arranged in an array. Each of the touch electrodes is electrically connected to a touch electrode wire. The touch electrode wire is also used as a common electrode line.

Compared with prior art in which an additional common electrode should be arranged nearby a touch electrode wire, in the self-capacitance touch display panel according to an embodiment of the present invention, since a signal loaded on a Tx wire is always identical to a signal on a common electrode during a display period and a touch control period of a touch panel, the touch electrode wire may double as a common electrode. In such a manner, decreases in aperture opening ratio and transmissivity of pixels due to introduction of a touch electrode wire can be reduced.

A self-capacitance touch display panel according to an embodiment of the invention will be described in detail in conjunctions with the appended drawings.

Figure 3:
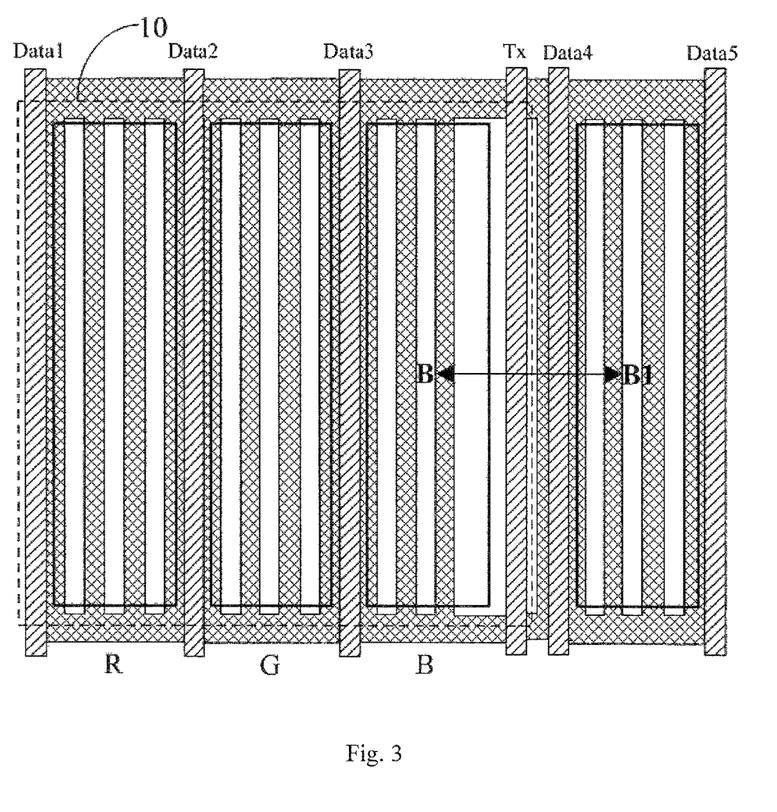
FIG. 3 is a plan view showing a structure of a self-capacitance touch display panel according to an embodiment of the present invention.
Figure 4:
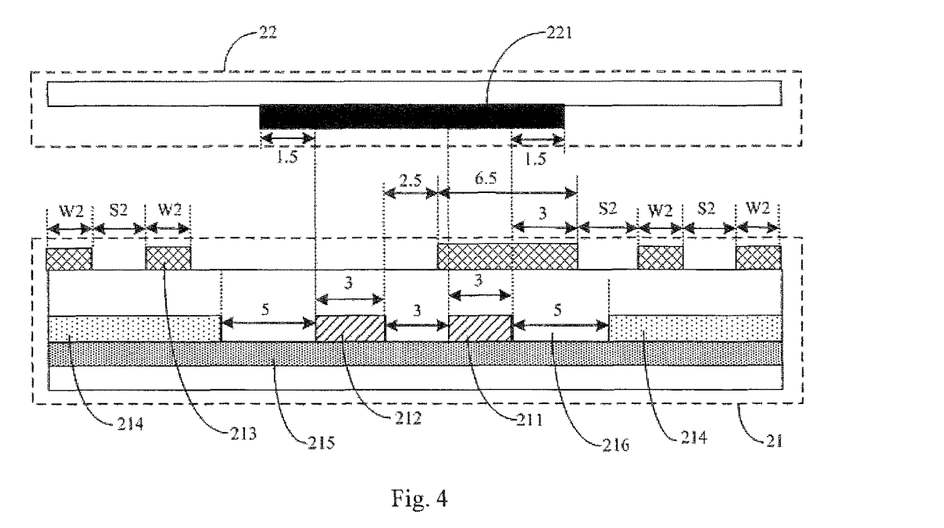
FIG. 4 is an illustrative structure drawing showing a cross section taken along a line B-B1 of FIG. 3.

As shown in FIGS. 3 and 4, a self-capacitance touch display panel according to an embodiment of the invention includes an array substrate 21 and a color filter substrate 22 that are disposed to face one another. FIG. 4 is an illustrative structure drawing showing a cross section taken along a line B-B1 of FIG. 3. The array substrate includes a plurality of common electrodes disposed on a base substrate, and each common electrode is divided into a plurality of blocks that double as touch electrodes. Preferably, in the embodiment of the invention, each common electrode is in a shape of a strip, a width of the strip-shaped common electrode is W2, and a distance between two adjacent strip-shaped common electrodes is S2. Values of W2 and S2 may be set according to practical production processes. In an embodiment of the invention, a material of the common electrode is selected from a group consisting of indium tin oxide (ITO), indium zinc oxide (IZO), and a composite of ITO and IZO. The material of the common electrode is not specifically limited in this disclosure.

As shown in FIG. 3, in an embodiment of the invention, the array substrate may include a plurality of data lines arranged in parallel with each other. Five data lines, i.e., Data1, Data2, Data3, Data4 and Data5, are shown in FIG. 3. The touch electrode (Tx) wires are arranged in the same layer as and insulated from the data lines, each of the touch electrodes corresponds to at least one Tx wire. In an exemplary embodiment, an area of an orthogonal projection of the Tx wire on the base substrate is equal to an area of an orthogonal projection of the data line on the base substrate. In another exemplary embodiment, the array substrate may also be manufactured through a method having six processes, each of the processes utilizing a mask. In such a method, gate electrodes, a semiconductor active layer, pixel electrodes, source electrodes, drain electrodes, a passivation layer and common electrodes are formed on the base substrate successively.

As shown in FIG. 3, in an embodiment of the invention, the array substrate may include a plurality of pixel units 10 arranged in an array. Each of the pixel units 10 includes at least three sub-pixel units. Embodiments of the invention are described by an example where each pixel unit 10 includes three sub-pixel units, each pixel unit 10 corresponds to one Tx wire, and the Tx wire is disposed between two adjacent pixel units 10. In other words, the Tx wire in this embodiment of the invention utilizes a dual-source configuration design as described above.

In the embodiment of the invention, the common electrode is divided into a plurality of blocks that are also used as touch electrodes, and actually, each of the touch electrode usually covers a region having a length up to a sum of lengths of scores of pixel units and a width up to a sum of widths of scores of pixel units. Thus, when each pixel unit corresponds to one Tx wire, each touch electrode will correspond to a plurality of the Tx wires. In this condition, the touch electrode only needs to be connected with one of the plurality of Tx wires, and only the Tx wire connected with the touch electrode is then connected to a drive integrated circuit integrated with display and touch control functions.

In order to provide a clear and direct explanation of the principles or reasons why pixel aperture opening ratio and transmissivity of a self-capacitance touch display panel can be increased through utilizing a touch electrode wire doubling as a common electrode line according to the embodiment of the invention, FIG. 4 shows a width of the black matrix 221 on the color filter substrate 22 that is located at a position corresponding to a dual-source configuration on the array substrate 21 of the embodiment of the invention. As can be seen from FIG. 4, a width of the data line 211 is 3 μm, a width of the Tx wire 212 is 3 μm, a distance between the data line 211 and the Tx wire 212 is 3 μm, a horizontal distance from a right side edge of the black matrix 221 to a right side edge of the data line 211 is 1.5 μm, a horizontal distance from a left side edge of the black matrix 221 to a left side edge of the Tx wire 212 is 1.5 μm, a distance between the Tx wire 212 and the pixel electrode 214 located at the left portion of the drawing is 5 μm, and a distance between the data line 211 and the pixel electrode 214 located at a right portion of the drawing is 5 μm. It can be seen from FIG. 4 that the width of the black matrix 221 is 12 μm. Compared with the prior art shown in FIG. 2, the width of the black matrix corresponding to the dual-source configuration according to the embodiment of the invention is relative small, such that the pixel aperture opening ratio and pixel transmissivity of the display panel can be increased.

As shown in FIG. 3, in the embodiment of the invention, the pixel unit 10 includes a red (R) sub-pixel unit, a green (G) sub-pixel unit and a blue (B) sub-pixel unit, and the Tx wire is arranged close to the blue sub-pixel unit. In FIG. 3, since no Tx wire exists at the right side and the left side of the green sub-pixel unit, lighting effect thereof would not be affected by the Tx wire. However, due to the existence of the Tx wire, lighting effect of the blue sub-pixel unit will certainly be affected. An embodiment of the disclosure also provides a simulation of lighting effect of the green sub-pixel unit and the blue sub-pixel unit.

Figure 5:
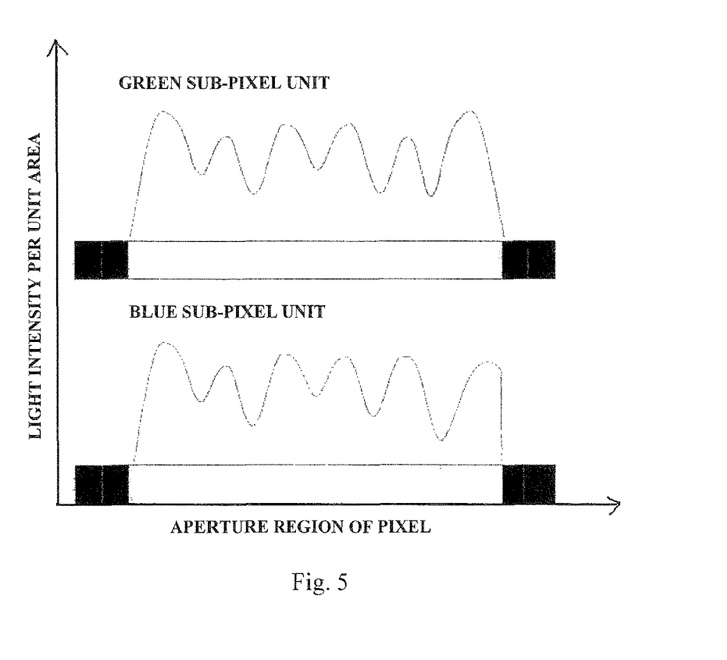
FIG. 5 is an illustrative diagram showing a simulation of lighting effect of a green sub-pixel unit and a blue sub-pixel unit according an embodiment of the present invention.

A result of the simulation is shown in FIG. 5, in which the transverse axis corresponds to an aperture region of a pixel, the longitudinal axis corresponds to light intensity per unit area, and a whole lighting effect of the pixel can be obtained through integrating the light intensities within the whole aperture region. As can be seen from FIG. 5, light intensities of the first four peaks of the green sub-pixel unit are the same as light intensities of the first four peaks of the blue sub-pixel unit, light intensity of the fifth peak of the blue sub-pixel unit is larger than that of the fifth peak of the green sub-pixel unit, and light intensity of the sixth peak of the green sub-pixel unit is larger than that of the sixth peak of the blue sub-pixel unit. Through integrating the light intensities within the whole aperture region, a result thereof shows that a whole lighting effect of the blue sub-pixel unit is slightly stronger than that a whole lighting effect of the green sub-pixel unit. The result of this simulation shows that the design of doubling the Tx wire as a common electrode according to the embodiments of the invention will not cause a decrease in lighting effect.

Further, in some special condition, the pixel design according to the embodiment of the invention equivalents to providing an additional common electrode as compared with prior art pixel designs, so that transmissivity of a pixel may be increased greatly. Specifically, doubling the Tx wire as a common electrode may increase an area of an effective light emitting region of a pixel, and in turn, the increase of the effective light emitting region may provide a space and probability for addition of the common electrode. With restrictions of practical production processes, there are minimum design values for the width of the common electrode and for the distance between adjacent common electrodes. Assuming that, in prior art, a sub-pixel can only be provided with n common electrodes at the most. If n+1 common electrodes need to be provided, an effective light emitting region of the sub-pixel needs to be enlarged by a relative small value x. With the design according to the embodiments of the invention, however, since the effective light emitting region of a sub-pixel has already been increased, if an increase value of the effective light emitting region is larger than the value x, then the sub-pixel can be provided with n+1 common electrodes. A result of a simulation of the number of the common electrodes and light intensity shows that the addition of one common electrode may bring about a great increase in transmissivity of a pixel. Herein, each of n and x is a positive number.

In another aspect of the invention, there is also provided a touch display device. In an exemplary embodiment, the touch display device may include the self-capacitance touch display panel described above. The touch display device may a LCD panel, a LCD device, a LCD television, an organic light emitting diode (OLED) panel, an OLED display device, an OLED television, an electronic paper or the like.

In a further aspect of the invention, there is also provided a method of driving the above-described self-capacitance touch display panel. In an exemplary embodiment, the method may include steps of:

during a display period, loading a common electrode signal onto the touch electrode though the touch electrode wire; and during a touch control period, loading a touch control driving signal onto the touch electrode through the touch electrode wire, receiving a sensing signal outputted from the touch electrode, and determining a position of a touch by a touch control signal detecting module based on the sensing signal outputted from the touch electrode, the touch control signal detecting module being connected with the touch electrode wire electrically connected with the touch electrode.

During the display stage, the touch electrode receives a common electrode signal such that the self-capacitance touch display panel performs a normal display function.

In summary, the embodiments of the invention provide a self-capacitance touch display panel, which includes an array substrate and a color filter substrate that are disposed to face one another. The array substrate includes a plurality of common electrodes disposed on a base substrate, and each common electrode is divided into a plurality of blocks that double as touch electrodes. Each touch electrode is electrically connected with a touch electrode wire, and the touch electrode wire doubles as a common electrode wire. Through doubling the touch electrode wire as a common electrode wire according to the embodiments of the invention, decreases in aperture opening ratio and transmissivity of pixels due to introduction of touch electrode wires can be reduced.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. A self-capacitance touch display panel, comprising:
an array substrate and a color filter substrate that are disposed to face one another; and
a black matrix,
wherein the array substrate comprise a common electrode disposed on a base substrate and configured to double as a plurality of touch electrodes, each touch electrode is electrically connected with a touch electrode wire,
wherein the touch electrode wire is configured to double as a common electrode wire, and
wherein an orthographic projection of the common electrode on the base substrate is spaced apart from an orthographic projection of the black matrix on the base substrate, and an orthographic projection of the touch electrode wire on the base substrate falls within the orthographic projection of the black matrix on the base substrate.

2. The self-capacitance touch display panel according to claim 1, wherein the common electrode is in a strip shape.

3. The self-capacitance touch display panel according to claim 2, wherein the array substrate comprises a plurality of data lines arranged in parallel with each other, the touch electrode wire is arranged in the same layer as and insulated from the data lines, and each of the touch electrodes corresponds to at least one touch electrode wire.

4. The self-capacitance touch display panel according to claim 3, wherein the array substrate comprises a plurality of pixel units arranged in an array, each of the pixel units comprises at least three sub-pixel units and corresponds to one touch electrode wire, and the touch electrode wire is disposed between two adjacent pixel units.

5. The self-capacitance touch display panel according to claim 4, wherein the at least three sub-pixel units comprises a red sub-pixel unit, a green sub-pixel unit and a blue sub-pixel unit, the touch electrode wire being arranged close to the blue sub-pixel unit.

6. The self-capacitance touch display panel according to claim 5, wherein an area of an orthogonal projection of the touch electrode wire on the base substrate is equal to an area of an orthogonal projection of the data line on the base substrate.

7. A touch display device, comprising the self-capacitance touch display panel according to claim 1.

8. The touch display device according to claim 7, wherein the common electrode is in a strip shape.

9. The touch display device according to claim 8, wherein the array substrate comprises a plurality of data lines arranged in parallel with each other, the touch electrode wire is arranged in the same layer as and insulated from the data lines, and each of the touch electrodes corresponds to at least one touch electrode wire.

10. The touch display device according to claim 9, wherein the array substrate comprises a plurality of pixel units arranged in an array, each of the pixel units comprises at least three sub-pixel units and corresponds to one touch electrode wire, and the touch electrode wire is disposed between two adjacent pixel units.

11. The touch display device according to claim 10, wherein the at least three sub-pixel units comprises a red sub-pixel unit, a green sub-pixel unit and a blue sub-pixel unit, the touch electrode wire being arranged close to the blue sub-pixel unit.

12. The touch display device according to claim 11, wherein an area of an orthogonal projection of the touch electrode wire on the base substrate is equal to an area of an orthogonal projection of the data line on the base substrate.

13. A method of driving the self-capacitance touch display panel according to claim 1, the method comprising:
    during a display period, loading a common electrode signal onto the touch electrode though the touch electrode wire; and
    during a touch control period, loading a touch control driving signal onto the touch electrode through the touch electrode wire, receiving a sensing signal outputted from the touch electrode, and determining a position of a touch by a touch control signal detecting module based on the sensing signal outputted from the touch electrode, the touch control signal detecting module being connected with the touch electrode wire electrically connected with the touch electrode.

14. The method according to claim 13, wherein the common electrode is in a strip shape.

15. The touch display device according to claim 14, wherein the array substrate comprises a plurality of data lines arranged in parallel with each other, the touch electrode wire is arranged in the same layer as and insulated from the data lines, and each of the touch electrodes corresponds to at least one touch electrode wire.

16. The touch display device according to claim 15, wherein the array substrate comprises a plurality of pixel units arranged in an array, each of the pixel units comprises at least three sub-pixel units and corresponds to one touch electrode wire, and the touch electrode wire is disposed between two adjacent pixel units.

17. The touch display device according to claim 16, wherein the at least three sub-pixel units comprises a red sub-pixel unit, a green sub-pixel unit and a blue sub-pixel unit, the touch electrode wire being arranged close to the blue sub-pixel unit.

18. The touch display device according to claim 17, wherein an area of an orthogonal projection of the touch electrode wire on the base substrate is equal to an area of an orthogonal projection of the data line on the base substrate.

* * * * *